United States Patent
Jones

(10) Patent No.: US 7,219,510 B2
(45) Date of Patent: *May 22, 2007

(54) COOLING SYSTEM FOR AN ON-BOARD INERT GAS GENERATING SYSTEM

(75) Inventor: Philip E. Jones, Naples, FL (US)

(73) Assignee: Shaw Aero Devices, Inc., Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/292,342

(22) Filed: Nov. 30, 2005

(65) Prior Publication Data

US 2006/0123831 A1 Jun. 15, 2006

Related U.S. Application Data

(63) Continuation of application No. 10/794,279, filed on Mar. 5, 2004, now Pat. No. 6,997,013.

(60) Provisional application No. 60/453,102, filed on Mar. 7, 2003.

(51) Int. Cl.
B01D 53/22 (2006.01)
F25D 9/00 (2006.01)
F25J 3/00 (2006.01)

(52) U.S. Cl. ............................ 62/401; 62/655; 95/45

(58) Field of Classification Search .................. 62/655, 62/401, 87, 402; 95/45, 54, 14; 244/118.5
See application file for complete search history.

(56) References Cited

U.S. PATENT DOCUMENTS

| | | |
|---|---|---|
| 4,378,920 A | 4/1983 | Runnels et al. |
| 4,508,548 A | 4/1985 | Manatt |
| 4,556,180 A | 12/1985 | Manatt |
| 4,681,602 A | 7/1987 | Glenn et al. |
| 5,101,656 A | 4/1992 | Miller |
| 5,779,897 A | 7/1998 | Kalthod et al. |
| 5,942,203 A | 8/1999 | Van Dijk et al. |
| 6,491,739 B1 | 12/2002 | Crome et al. |
| 6,997,013 B2 * | 2/2006 | Jones .................. 62/655 |
| 2001/0035092 A1 | 11/2001 | Hachimaki et al. |
| 2003/0116679 A1 | 6/2003 | Susko |
| 2003/0233963 A1 | 12/2003 | Crome |
| 2004/0025507 A1 | 2/2004 | Leigh et al. |
| 2004/0035461 A1 | 2/2004 | Susko |

* cited by examiner

Primary Examiner—William C. Doerrier
(74) Attorney, Agent, or Firm—Morgan, Lewis & Bockius LLP

(57) ABSTRACT

The inert gas generating system includes a compressed air source, a cooling air source, and a separation module. The separation module includes first and second inlets and outlets. The first inlet is coupled to the compressed air source. The first outlet is coupled to the first inlet via a bundle of hollow fiber membranes. The second inlet is coupled to the cooling air source, and the second outlet is coupled to the second inlet via a space surrounding the bundle of hollow fiber membranes.

20 Claims, 9 Drawing Sheets

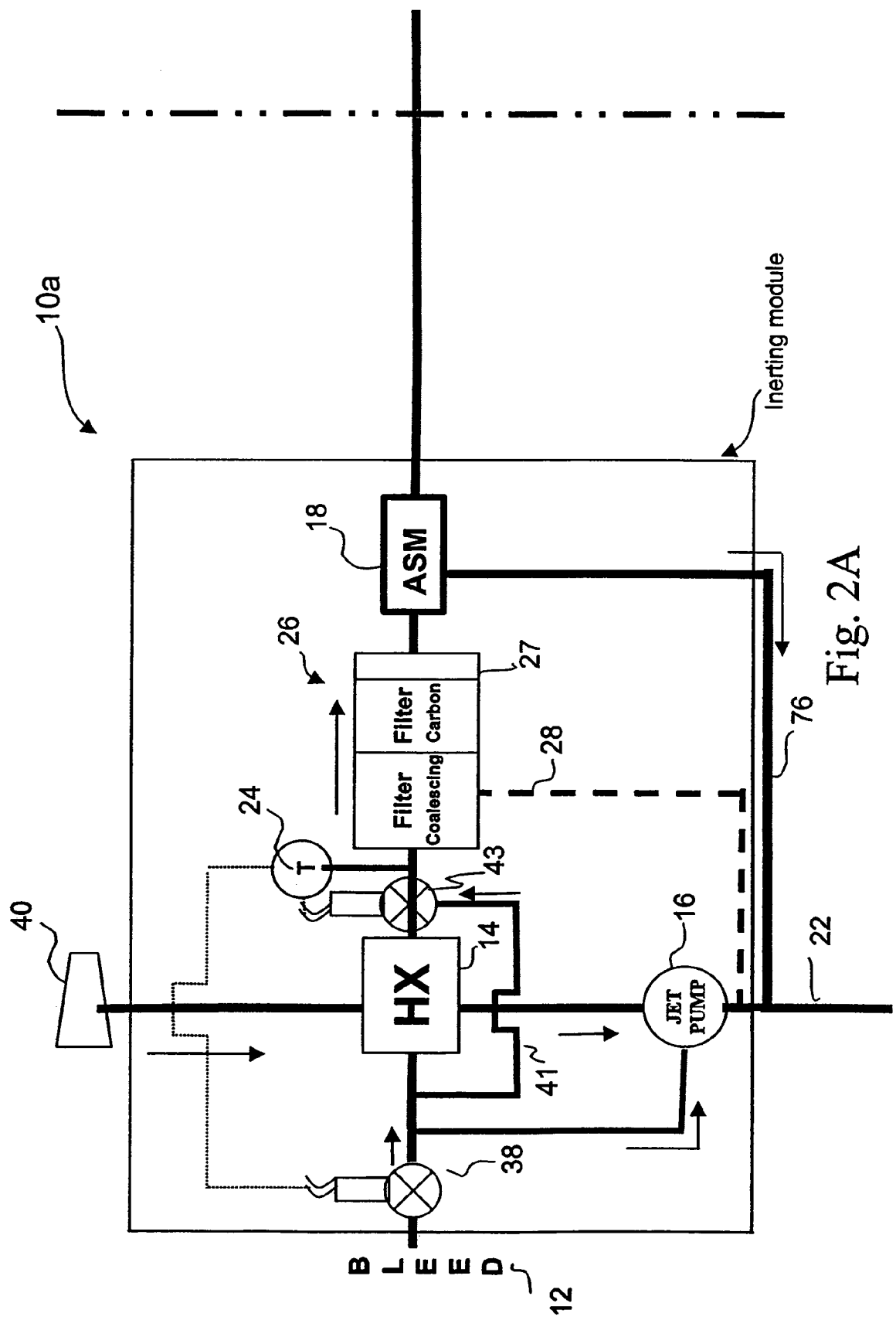

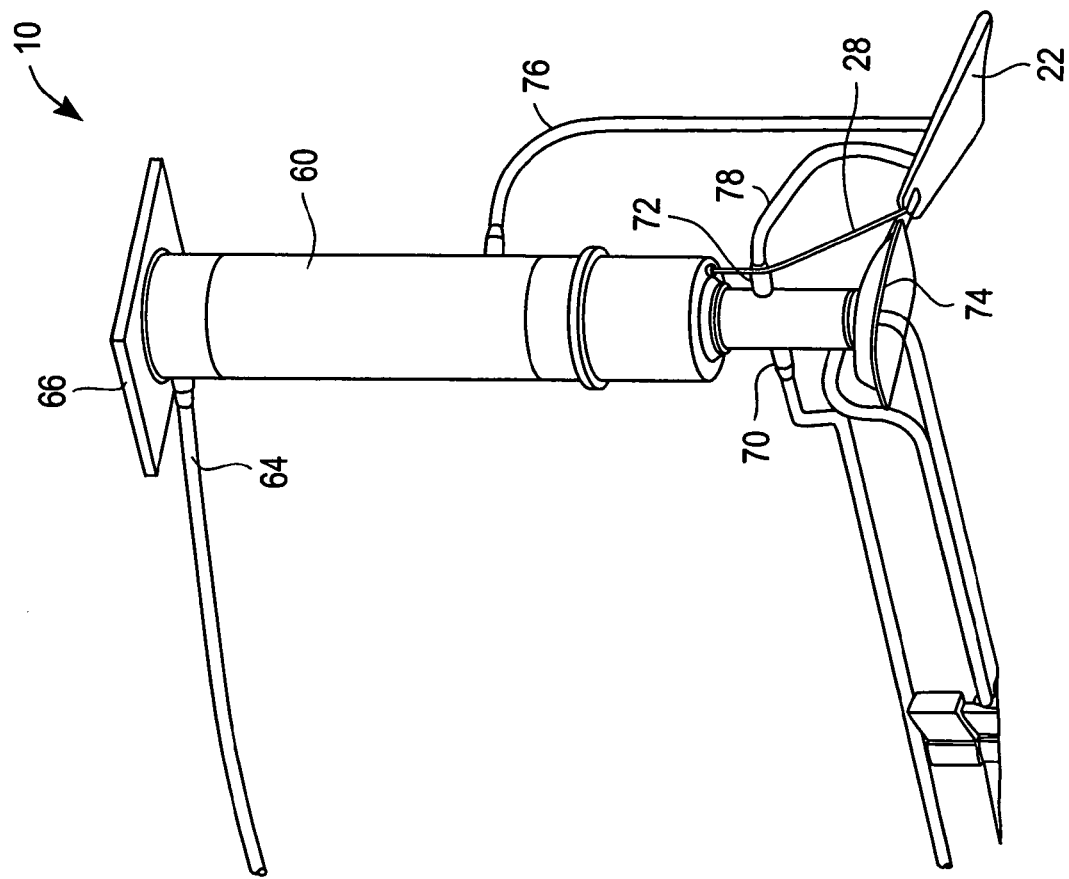
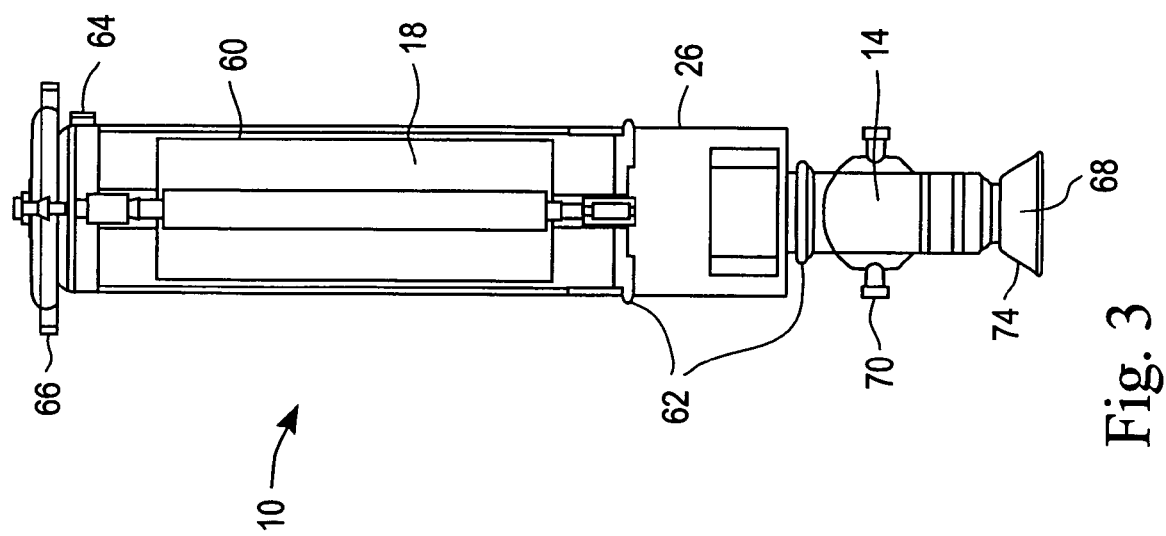
Fig. 4
Fig. 3

COOLING SYSTEM FOR AN ON-BOARD INERT GAS GENERATING SYSTEM

CROSS REFERENCE TO RELATED APPLICATIONS

This application is a continuation of prior U.S. patent application Ser. No. 10/794,279, filed Mar. 5, 2004 now U.S. Pat. No. 6,997,013, which claims the benefit of U.S. Provisional Patent Application No. 60/453,102, filed Mar. 7, 2003, all of which are incorporated by reference herein in their entirety.

BACKGROUND OF THE INVENTION

1. Field of the Invention

The invention relates generally to cooling systems. More specifically, the invention relates to a system and method for cooling a nitrogen enriched air stream as it passes through an air separation module (ASM) of an On-board Inert Gas Generating Systems (OBIGGS).

2. Description of Related Art

The energy requirements of most modern aircraft are supplied by combusting aviation gasoline, which is typically stored in fuel tanks within an aircraft's wings. Such fuel tanks also contain an explosive fuel/air mixture in the area above the fuel, otherwise known as the ullage. Accordingly, many systems have been developed to reduce the danger of accidentally igniting this air/fuel mixture.

One way of addressing such a danger is to replace the explosive air/fuel mixture with a nonflammable inert gas, usually nitrogen. The On-board Inert Gas Generating System (OBIGGS) does just this, by separating nitrogen from local, ambient air and replacing the fuel/air mixture in the ullage with this nitrogen.

Military aircraft have used OBIGGS systems for many years to protect against fuel tank explosions caused by extreme aircraft operation and exposure to small arms fire. However, military aircraft are not the only aircraft that would benefit from OBIGGS. For example, investigations into the cause of recent air disasters have concluded that unknown sources may be responsible for fuel tank ignition and explosion. Subsequently, OBIGGS has been evaluated as a way to protect commercial aircraft against such fuel tank explosions caused by any ignition source.

Prior OBIGGS systems have proved relatively unreliable, heavy, and costly for both initial acquisition and non-military operation. Accordingly, a need exists for a reliable, simple, light, and inexpensive OBIGGS system for commercial aircraft application.

Moreover, the inert gas introduced into the ullage must be at a relatively low temperature. To ensure that the inert gas is at a sufficiently cool temperature, current OBIGGS systems typically pre-cool the air entering the ASM of the OBIGGS system using bulky and expensive heat exchangers. Such a heat exchanger is shown in U.S. Pat. No. 4,556,180. Accordingly, a system and method for cooling the inert air before it is introduced into the ullage, while eliminating the use of bulky and costly heat exchangers, would be highly desirable.

SUMMARY OF THE INVENTION

The present invention provides a system and method for reducing the possibility of combustion in aircraft fuel tanks by replacing air in the ullage of the fuel tank with an inert gas that has been separated out from the engine bleed air.

In one embodiment of the invention there is provided an inert gas generating system. The inert gas generating system includes a compressed air source, a cooling air source, and a separation module. The separation module includes a housing, multiple hollow fiber membranes disposed at least partially within the housing, first and second inlets, and first and second outlets. The first inlet is fluidly coupled to the compressed air source, while the first outlet is fluidly coupled to the first inlet via the hollow fiber membranes. The second inlet is fluidly coupled to the cooling air source, while the second outlet is fluidly coupled to the second inlet via a space surrounding the hollow fiber membranes. The separation module also preferably includes an on-board filter positioned between the first inlet and the hollow fiber membranes. In addition, the inert gas generating system also preferably includes a filter positioned between the compressed air source and the first inlet. Also, a filter may be positioned between the second inlet and the space. In a preferred embodiment, a valve is coupled between the cooling air source and the second inlet. A temperature sensor is also coupled between the cooling air source and the second inlet. The temperature sensor is configured to control the valve based on a temperature of the cooling air.

In another embodiment of the invention there is provided a method for generating inert gas. Air is firstly compressed into compressed air. Thereafter, the compressed air is introduced into multiple hollow fiber membranes. The compressed air is separated into nitrogen Enriched Air (NEA) within the hollow fiber membranes and oxygen enriched air (OEA) in a space surrounding the hollow fiber membranes. At the same time, cooling air is introduced into the space to cool the NEA within the hollow fiber membranes into cooled NEA. The cooled NEA is then expelled from the hollow fiber membranes, and the OEA and the cooling air is expelled from the space. Accordingly, the present invention enhances the performance of the system by cooling the NEA flow. This is accomplished by transferring the heat of the NEA flow to the cooling air flow from the external surface of the hollow fibers. This significantly simplifies the system and eliminates the need for a separate heat exchanger.

BRIEF DESCRIPTION OF THE SEVERAL VIEWS OF THE DRAWINGS

The foregoing and other aspects and advantages of the present invention will be better understood from the following detailed description when read in conjunction with the drawings, in which:

FIG. 2A is a schematic view of a further alternative embodiment of the invention;

FIG. 3 is a cross-sectional view of a modular system according to the invention;

FIG. 4 is a perspective view of an embodiment of the invention;

DETAILED DESCRIPTION OF THE PREFERRED EMBODIMENTS

Figure 1:
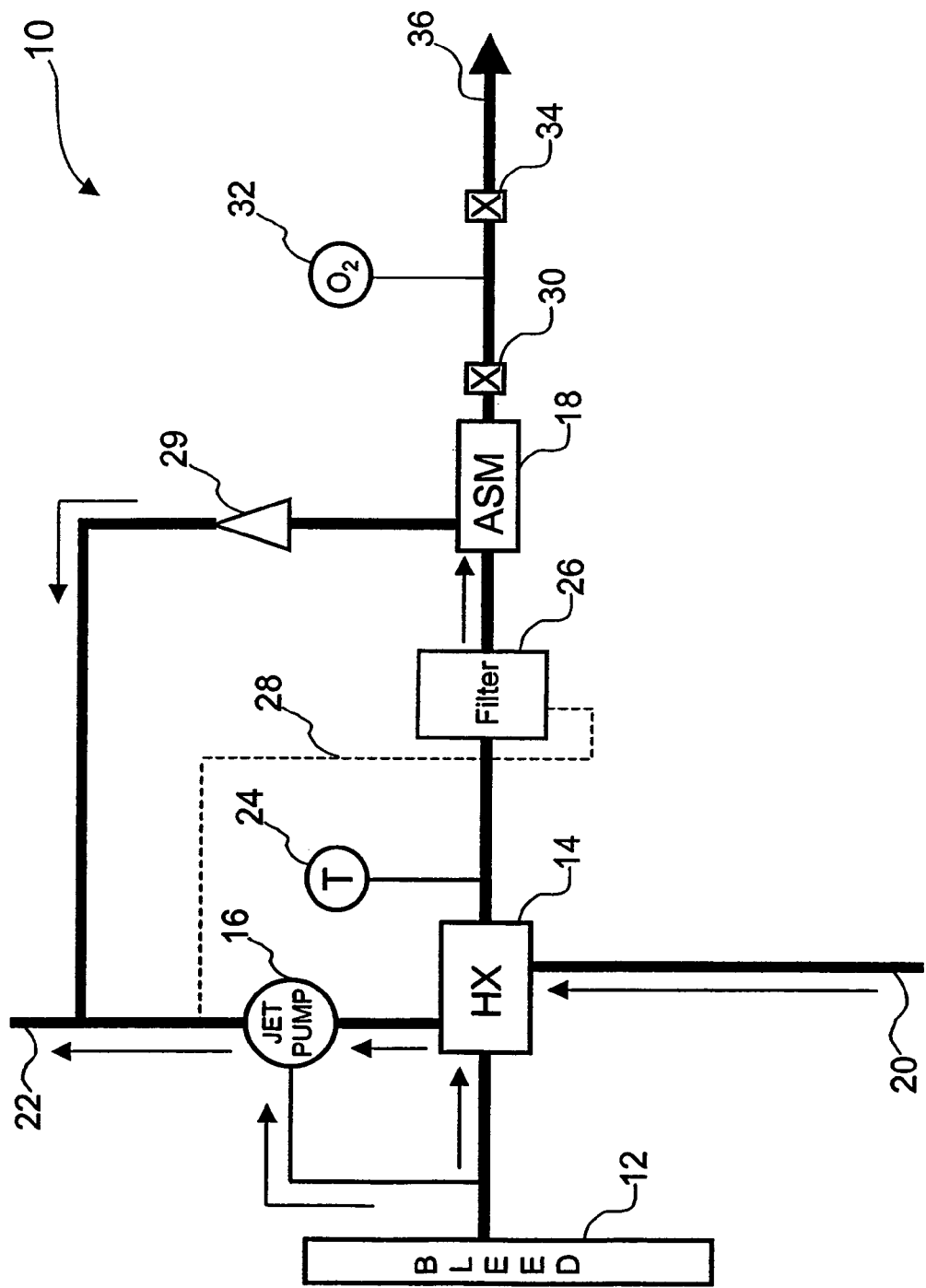
FIG. 1 is a schematic view of one embodiment of a modular on-board inert gas generating system according to the present invention.

As illustrated in FIG. 1, system 10 according to one embodiment of the invention uses aircraft engine bleed air 12 that is supplied under conditions of elevated temperature and elevated pressure to generate gas for inerting aircraft fuel tanks. It will be appreciated by persons skilled in the art that the present invention is equally useful for inerting cargo holds and other void spaces. Engine bleed air is typically supplied from taps in the compressor section of the aircraft engines at temperatures in the range of 300° F.–400° F. and at pressures in the range of 10–45 psig depending on compressor rotation speed. It is typically used as a utility source of pressurized air on board aircraft. System 10 operates whenever bleed air is available and, thus, avoids the use of compressors or complex control valves.

Bleed air 12 is introduced at one end of system 10 and nitrogen-enriched air (NEA) is produced from the other end. Bleed air 12 flows under pressure and temperature to heat exchanger 14. A branch passage taps off a small portion of the pressurized bleed air to power jet pump 16. For efficient operation, depending on size, air separation module (ASM) 18 typically requires input air temperature less than about 200° F. Heat exchanger 14 is therefore used to control the temperature of the engine bleed air fed into ASM 18. Secondary cooling flow 20 is provided to heat exchanger 14 for this purpose. Jet pump 16 may be optionally utilized to provide the cooling flow, which is vented overboard at outlet 22. If desired, temperature sensor 24 may be positioned down stream of the heat exchanger to monitor output temperature and control secondary flow 20 and/or jet pump 16 based on the monitored temperature.

The pressurized airflow from heat exchanger 14 enters filter 26. Filter 26 may comprise multiple filters, such as a coalescing filter to remove particulate contaminants and moisture, and a carbon filter for removing hydrocarbons. Line 28 drains removed moisture and directs it overboard at outlet 22.

After leaving filter 26, the conditioned air enters ASM 18. Typically, ASM 18 provides a total flow in the range of approximately 2–4 lbs./min. Depending on aircraft requirements or other system limitations, other sizes of ASM may be selected. Using conventional hollow-fiber technology, ASM 18 separates the air into oxygen-enriched air (OEA) and nitrogen-enriched air (NEA). In a preferred embodiment, the ASM provides nitrogen-enriched air at flow rates between about 0.5 lbs./min. up to about 2 lbs./min. At the lower flow rates a greater nitrogen purity can be achieved, with oxygen making up only about one percent by volume of the nitrogen-enriched air. At higher flow rates the oxygen content of the nitrogen-enriched air is typically about nine to ten percent by volume. Oxygen-enriched air is piped from ASM 18 overboard through outlet 22. Check valve 29 is provided in the overboard OEA line to prevent back-flow. Nitrogen-enriched air produced by ASM 18 is directed to the fuel tank and/or cargo hold. Orifice 30 is preferably provided downstream of ASM 18 to control the flow rate through the ASM. If desired, a stepped or variable orifice may be provided to control flow rate as described in greater detail below. Optional oxygen sensor 32 may be configured to provide signals representing oxygen content of the NEA. Another optional sensor that may be provided is mass airflow sensor 34. This may be an automotive-style hot wire mass-flow sensor. System outlet 36 directs the NEA to the fuel tank ullage and optionally to aircraft cargo hold as desired.

Figure 2:
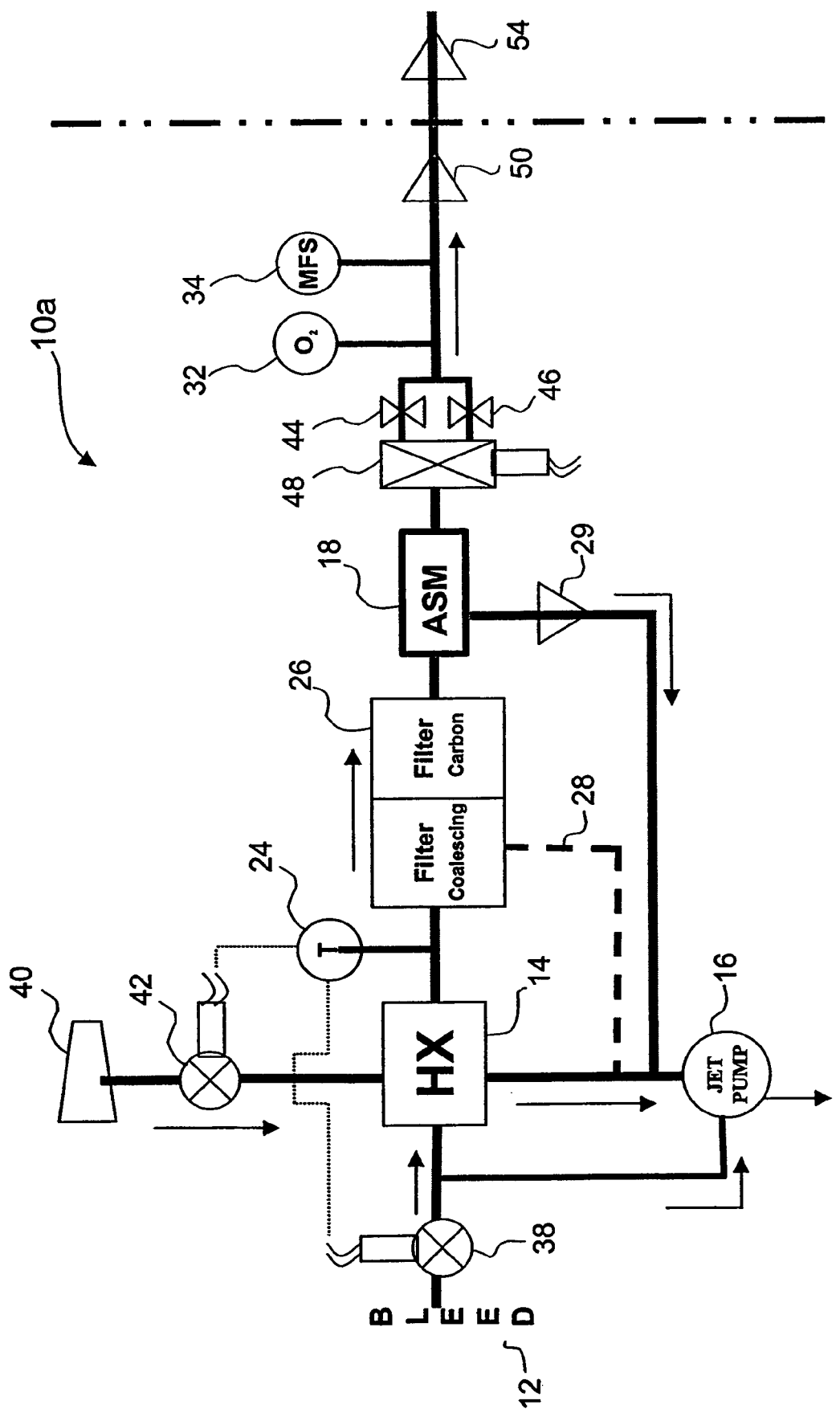
FIG. 2 is a schematic view of an alternative embodiment of the invention.

In an alternative embodiment illustrated in FIG. 2, engine bleed air first passes through an isolation valve 38. Isolation valve 38 permits system 10a to be isolated from the bleed air and, if desired, may be controlled by signals from temperature sensor 24. In this embodiment secondary cooling air is provided by an atmospheric inlet or scoop (ram air) 40. Secondary cooling air may also be provided by an NACA scoop. Secondary cooling air passes through temperature modulation valve 42, which also may be controlled by temperature sensor 24. Alternatively, temperature control of the primary bleed airflow may be achieved through a modulated by-pass flow arrangement (described in detail with reference to FIG. 2A). Secondary cooling air obtained from scoop 40 typically will have a temperature ranging from about −60° F. to 110° F. or greater, depending on the environmental conditions experienced by the aircraft. The secondary airflow again passes through heat exchanger 14, optionally assisted by jet pump 16. Operation of filter 26 and ASM 18 is essentially as described above. In this exemplary embodiment, an orifice is provided with two steps or as a stepped choke valve. For example, a first orifice 44 presents an opening of a first size and second orifice 46 presents an opening of a second size. The orifice seen by the NEA flow is determined by orifice selector 48, which may be a motor actuated valve. The orifice selector is utilized to control the flow rate as described below. NEA exiting the system optionally passes through a first check valve 50, after which it is directed through the fuel tank or cargo hold bulkhead 52. A second check valve 54 may be provided before the NEA is injected into the fuel tank or cargo hold.

The embodiments of the present invention as described above take advantage of characteristics of ASM 18 to produce higher purity NEA (lower O2 content) when flow is restricted. Flow may be restricted using down stream orifices or back pressure. In the embodiments utilizing the variable orifices, preferably two different restrictions are used. Other numbers might be used if warranted by system performance and requirements. Generally, a high restriction provides low flow and high purity, and a low restriction provides a higher flow and low purity. These embodiments rely on existing aircraft vent systems to provide normal tank inward and outward venting while mixing the NEA in the tank ullage or cargo hold space. A high NEA outlet purity combined with a longer flow time will result in an ullage gas with a higher NEA purity. During the climb and cruise portion of a flight, the high purity (low flow) NEA is delivered to the fuel tank. This stores a high nitrogen concentration gas in the fuel tank ullage. During the descent portion of the flight, in which more air vents into the fuel tank as altitude decreases, the orifice is set to provide a lower restriction and higher flow, thus producing a lower purity NEA but at greater volume. However, because high purity NEA is already stored in the fuel tank ullage, air forced in through tank vents during descent simply serves to decrease the nitrogen purity. When supplemented by the high flow low purity NEA provided during descent, the ullage maintains a nitrogen purity sufficient to maintain the inert condition. Given the typical commercial flight profile, although the nitrogen level decreases during aircraft descent, with an appropriately sized system nitrogen levels can be maintained at an inert level through aircraft landing.

In further alternative embodiments, the system of the present invention may be designed to eliminate components such as sensors, variable orifices and the jet pump, thereby further simplifying the system and increasing reliability. In one embodiment, orifices 44 and 46, and selector valve 48 are eliminated by sizing the system to meet extreme operating conditions at all times. This may be accomplished by sizing the system to provide sufficient NEA during climb and cruise operation, so that the oxygen level in the ullage remains at below a critical level during descent and landing. Typically, the critical oxygen level will be less than about 10%–14% oxygen, more particularly less than about 12% oxygen. For example, if a system using the multiple orifices as described above were sized to provide NEA at 0.5 lbs/min with 1% oxygen during climb and cruise, in eliminating the orifices the system may be sized to provide NEA continuously with about 2% oxygen at a slightly higher flow rate. Factors considered include fuel tank size and aircraft flight profile. The system is then designed to, in effect, store high purity NEA in the fuel tank ullage so that upon inflow of air during descent the critical oxygen level is not exceeded before aircraft operation ceases after landing.

In another embodiment, jet pump 16 may be eliminated by sizing the system to rely only on ram air from scoop 40 for secondary cooling flow. This has the advantage of further simplifying the system by removing another component. This advantage must be balanced with the need for additional ground service equipment to provide cooling for testing and maintenance when the aircraft is not in flight.

Another variation involves the removal of temperature sensor 24 and temperature modulation valve 42. In this embodiment, a maximum hot temperature is assumed based on the expected operating conditions. ASM 18 is then sized to provide the required purity of NEA based on an input temperature at the assumed maximum.

Oxygen sensor 32 and mass flow sensor 34 also may be eliminated if system health monitoring is only to be performed on the ground using ground service equipment. These alternatives for reducing system complexity may be employed alone or in any combination. Exact sizing of the system in the various alternatives described will depend upon the inerting needs and flight profile of the particular aircraft in which the system is to be mounted. A person of ordinary skill in the art will be able to match the system to the aircraft inerting needs based on the disclosure contained herein.

In FIG. 2A, a further alternative embodiment of the invention uses primary heat exchanger bypass flow control to control the temperature of the air entering the ASM inlet. Bypass valve 43 controls the airflow to heat exchanger 14 by controlling the amount of permitted bypass flow. Bypass valve 43 modulates incrementally between closed, causing all bleed air to flow through heat exchanger 14, and open, allowing the unrestricted bypass of bleed air around heat exchanger 14. The airflow allowed to bypass heat exchanger 14 follows bypass conduit 41 to the air conduit upstream of temperature sensor 24 and filter 26. Temperature sensor 24 is, therefore positioned to determine the temperature of air entering filter 26 and ASM 18. That temperature is used to direct bypass valve 43 to open and allow an appropriate amount of air to flow around heat exchanger 14 so that the temperature of the air entering filter 26 and ASM 18 is within a desired temperature range. Bypass valve 43 is preferably a phase-change direct acting mechanical sensor and flow control valve. Temperature modulation valve 42 (FIG. 1) and the corresponding control capability are added for additional temperature control if desired.

As also shown in FIG. 2A, filter 26 may include three sections. As previously described, filter 26 may contain a coalescing and solid containment HEPA filter section, for removing particles and water, and a carbon filter section for hydrocarbon removal. In this embodiment, the filter also includes an additional HEPA filter 27, similar to the first filter section, to prevent carbon filter bits from flaking off the previous filter section and traveling to ASM 18. Subcomponents downstream of ASM 18 may be eliminated as shown in FIG. 2A to reduce cost and complexity. In this embodiment the OEA outlet 76 exits the module to combine with the cooling airflow downstream of the jet pump 16. The filter drainpipe 28 also merges with the cooling airflow downstream of the jet pump 16, but does so within the modular assembly. The embodiments shown in FIG. 2A are otherwise as described with reference to FIG. 2.

In a further preferred embodiment of the invention, system 10 is provided as a modular assembly as shown in FIGS. 3 and 4. In one embodiment, components such as ASM 18, filters 26 and heat exchanger 14 are provided within common housing 60. Alternatively, housing 60 may encompass only the ASM and filters, with the heat exchanger mounted thereon to form a single modular unit. For example band clamps 62 may be provided between ASM 18 and filter 26, and filter 26 and heat exchanger 14 to secure the components together.

At the outlet side, NEA outlet port 64 communicates with the fuel tank ullage. An upper mounting bracket 66 may be provided for securing the unit in an appropriate aircraft space. At the inlet side, inlet 68 receives engine bleed air 12 and directs it toward heat exchanger 14. Secondary air inlet 70 provides a secondary cooling airflow and outlet 72 communicates with overboard outlet 22. Lower mount 74 also may be provided for securing the unit. As shown in FIG. 4, OEA outlet pipe 76, secondary airflow pipe 78 and filter drainpipe 28 all lead to overboard outlet 22. Oxygen and mass flow sensors may be provided as part of the modular unit, or separately provided, depending on space and installation requirements. Similarly, the orifice and associated control valve may be included in the modular system.

The single-housing design thus facilitates a simple, lightweight configuration that minimizes both acquisition, in-service and certification costs by eliminating many of the sub-components previously required in such systems. By eliminating sub-components the single-housing design will also minimize installation costs when compared to the current distributed component approach. The single-housing design also improves reliability. In a preferred embodiment, the filter is arranged to be an easily replaceable, disposable cartridge, thereby enhancing maintainability.

Figure 3A:
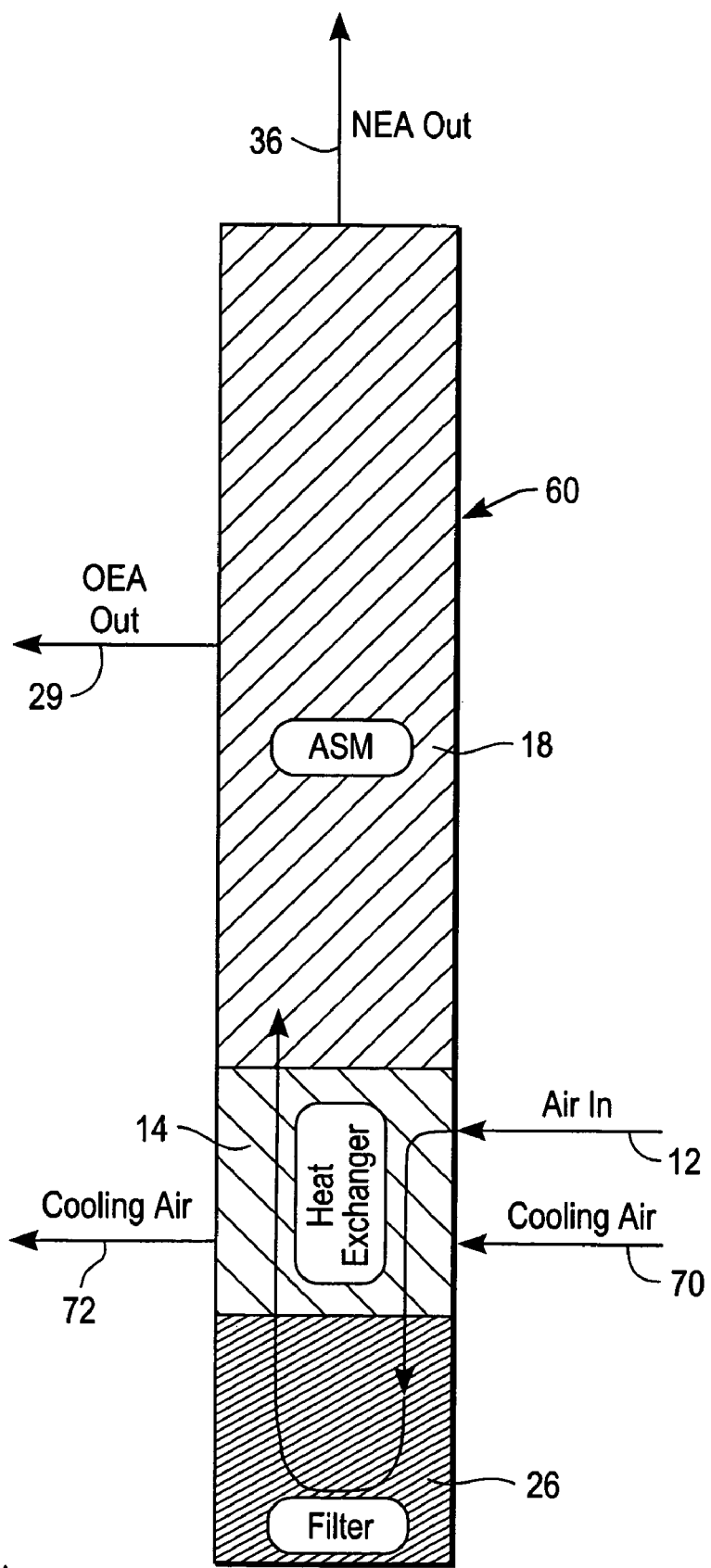
FIG. 3A is a cross-sectional view of another modular system according to the invention.

FIG. 3A shows an additional preferred embodiment of a modular assembly with components contained within a housing 60. In this embodiment, the components are arranged so that heat exchanger 14 is between filter 26 and ASM 18. Among other advantages, depending on installation requirements, this arrangement provides better access to filter 26 for maintenance purposes. FIGS. 1 and 2 still describe the function of this embodiment, with the internal plumbing of the various airflows configured to accommodate the component arrangement in FIG. 3A.

Using the modular approach as described, a module may be designed to provide particular, predetermined NEA flow and multiple modules employed to meet higher flow rate requirements. For example, the individual module may be sized to meet the inerting requirements of a particular customer's smallest aircraft. For larger aircraft of the same customer, instead of redesigning the module, multiple modules are employed to meet the higher flow rate requirements. In this manner, inventory and maintenance costs are reduced because only one type of equipment is required to service an entire fleet of aircraft of different sizes.

Figure 3B:
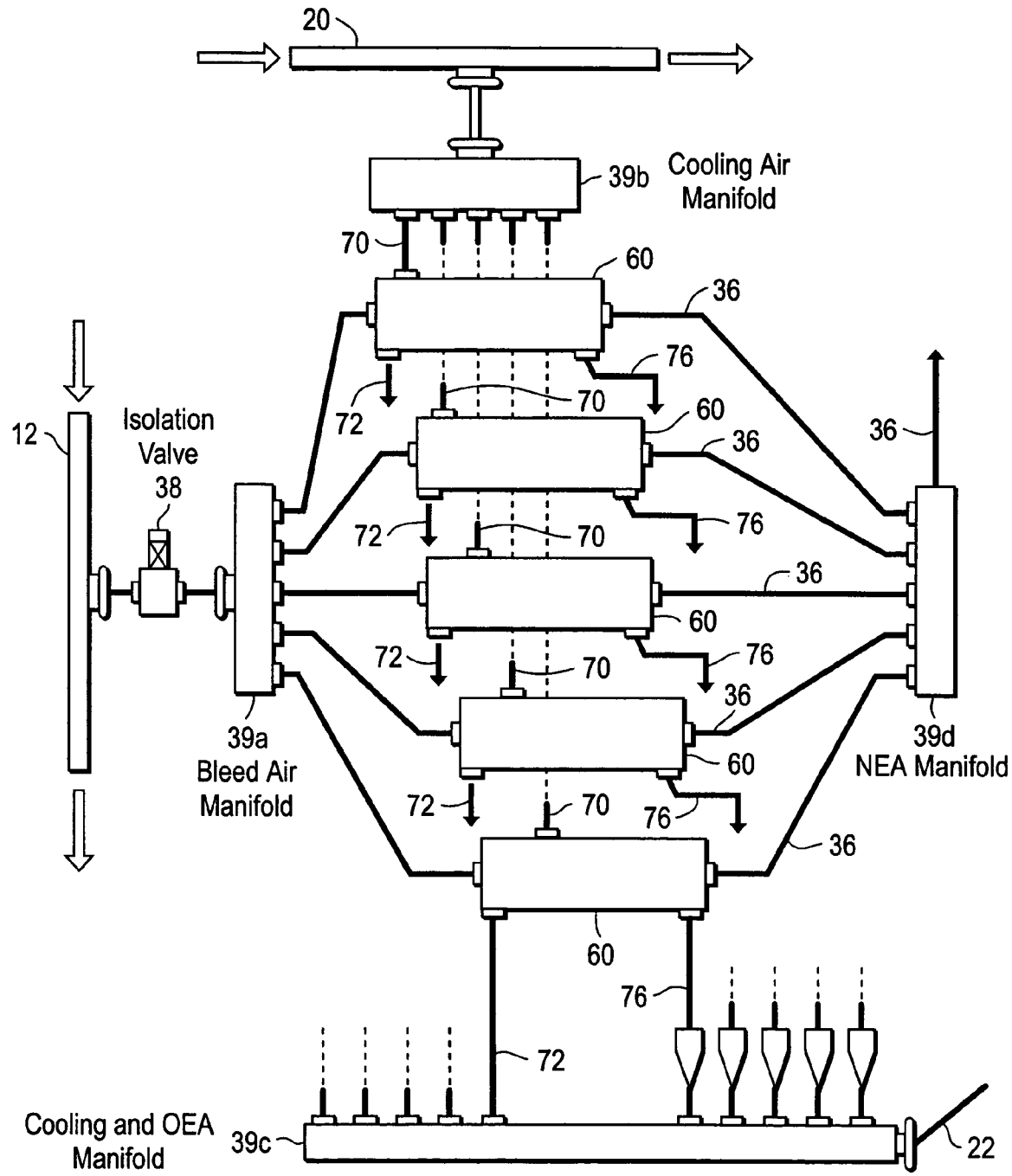
FIG. 3B is a schematic view of a modular system employing multiple modules according to the invention.

FIG. 3B shows one possible arrangement of a modular assembly employing multiple modules. In this embodiment, five housings 60 each contain an ASM 18, heat exchanger 14, and filter 26, as depicted in either of FIGS. 3 or 3A. The housings are plumbed together in parallel. Bleed air 12 is provided to each heat exchanger 14 through a single isolation valve 38 and a manifold 39a. Similarly, manifold 39b provides cooling flow 20 to heat exchanger 14 and manifold 39c collects both the OEA and the post-heat exchanger cooling airflow and directs it overboard 22. NEA is collected by manifold 39d and directed to system outlet 36 and the fuel tank ullage.

A further embodiment of the invention boosts system flow performance by tapping bleed air from the high-pressure segment of the aircraft's air cycle machine (ACM). Aircraft environmental control systems often use an air compressor to increase bleed air pressure and temperature in the ACM. This can be used alone or in conjunction with a turbocharger to apply a significantly higher pressure to the ASM. The higher pressure increases the flow and /or purity performance of the ASM, resulting in a smaller and less costly ASM for equivalent system performance. Alternatively, for larger aircraft, fewer ASM's may be required using this embodiment, again resulting in reduced costs and reduced complexity.

The apparatus and method of the present invention provide a more satisfactory OBIGGS for a number of reasons. The modular approach to the design of the equipment reduces acquisition and installation costs. The cartridge-style filter with quick-release installation features, together with high OBIGGS reliability due to reduced complexity, also reduces operational costs. The methodology of increasing NEA purity in the tank ullage during cruise, together with increased flow/lower purity NEA injection during descent gives all of the benefits of a traditional OBIGGS system with a much smaller, lighter, less costly, more reliable system.

Figure 5:
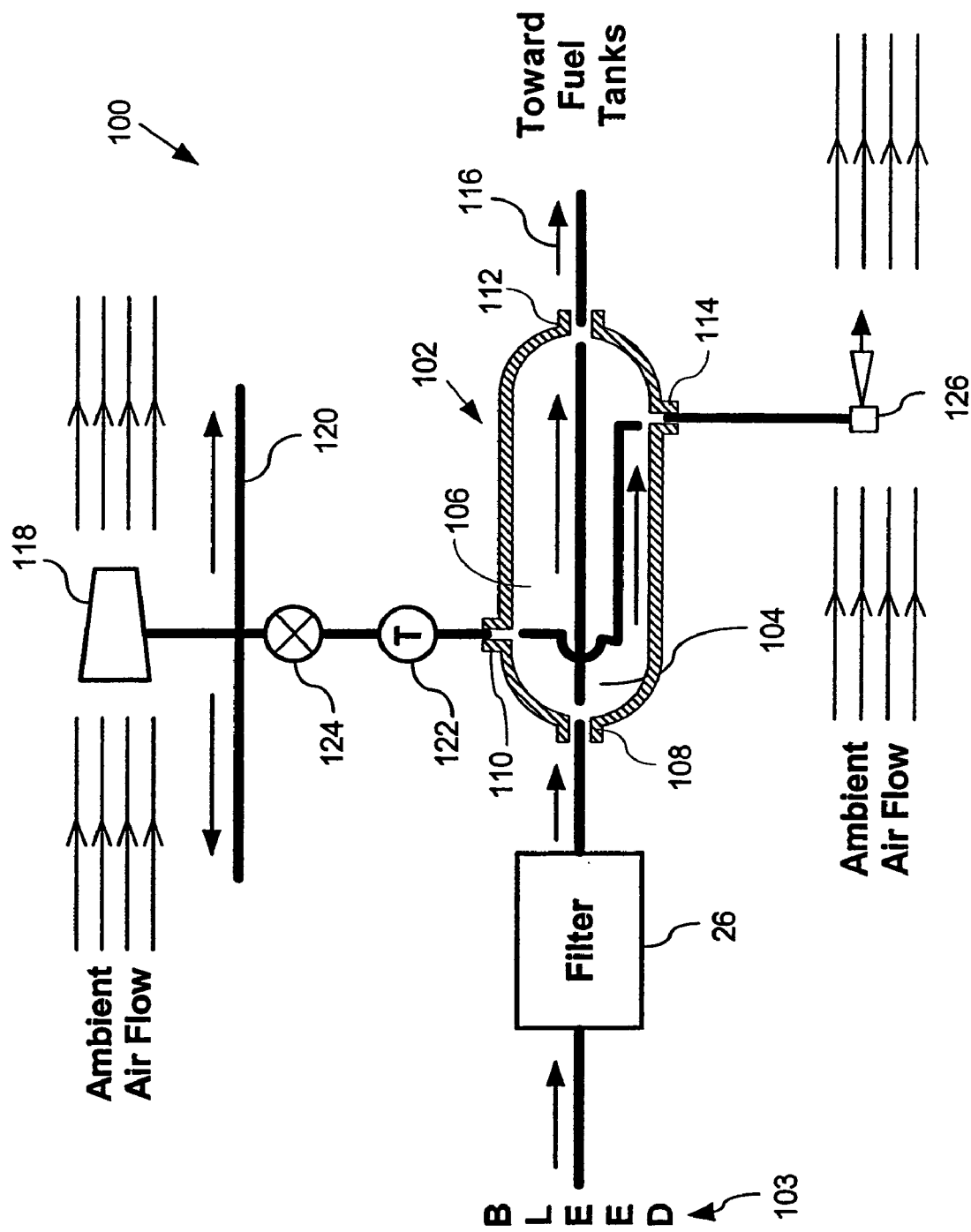
FIG. 5 is a schematic view of another on-board inert gas generating system that includes an air separation module (ASM) incorporating a cooling system, according to another embodiment of the invention.

FIG. 5 is a schematic view of another on-board inert gas generating system 100 that includes a separation module 102 that also cools the outgoing inert gas. Generally, the temperature of the compressed air entering the separation module is first lowered, as inert gas introduced into the aircraft's fuel tanks must be at low temperatures to avoid additional fuel vaporization. Such fuel vaporization may compound the original problem of having an explosive fuel/air mixture in the ullage. Accordingly, the temperature of the compressed air is lowered before it enters the separation module. The typical source of such compressed air is bleed air that is supplied from taps in the compressor section of the aircraft engines at temperatures in the range of 300° F.–400° F.

The system 100 eliminates the need for pre-cooling the compressed air before is enters the ASM 102. Rather, the ASM itself acts as a heat exchanger to reduce the temperature of the separated inert gas before it is stored in the aircraft's fuel tanks.

Figure 6:
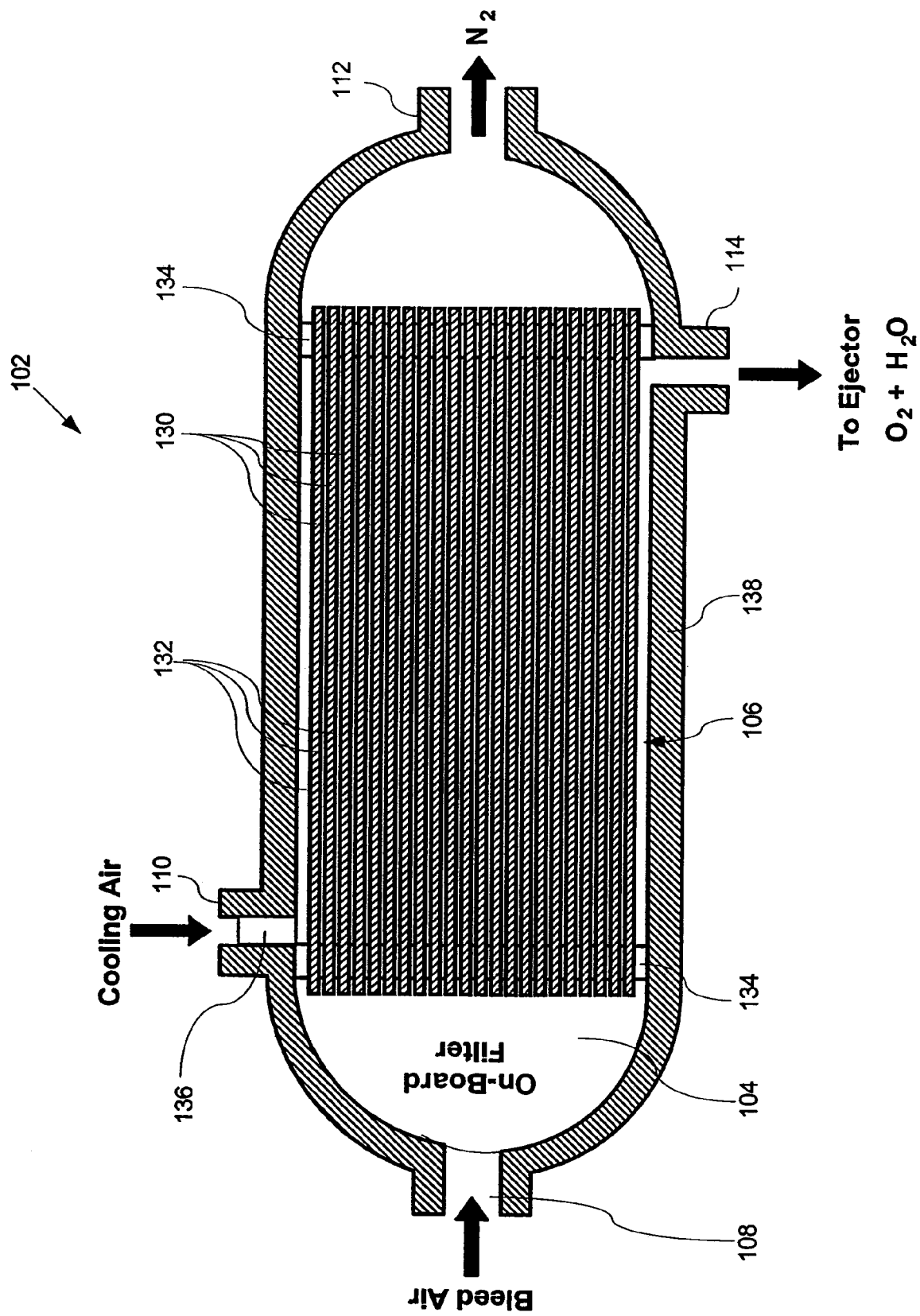
FIG. 6 is a more detailed view of the separation module, as shown and described in relation to FIG. 5.

The separation module 102 preferably includes an on-board filter 104 (best seen in FIG. 6) and an on-board ASM 106, as best seen in FIG. 6. The on-board filter is similar to filter 26 (FIG. 3A) described above. Alternatively, or in addition to the on-board filter 104, a separate filter 26 may be coupled between the source of the compressed air and the separation module 102, as described above. The separation module also preferably includes a first inlet 108, a second inlet 110, a first outlet 112, and a second outlet 114. The first inlet 108 is coupled to a compressed air source, such as an aircraft's bleed air 103. The first outlet is preferably coupled to the aircraft fuel tanks or cargo areas.

The ASM 106 serves to separate inert gas, such as nitrogen, from the compressed air, such as oxygen and water vapor. The inert gas is expelled from the first outlet 112 as shown by arrow 116, toward the fuel tank/s, as described above.

The second inlet 110 is coupled to a cooling air source. In a preferred embodiment, this cooling air source is the ambient airflow surrounding the aircraft. This ambient airflow is preferably captured by a scoop 118, such as a NACA scoop. Alternatively, the cooling air may be supplied from a tap into another line 120 that obtains cooling air from a scoop or the like. A temperature sensor 122 measures the temperature of the cooling air introduced into the second inlet 110. This temperature from the temperature sensor 122 is used to control a valve 124 disposed between the source of cooling air and the second inlet 110. It should be appreciated that the temperature sensor may be positioned elsewhere, such as at second outlet 114.

The second outlet 114 is preferably coupled to an ejector 126 that expels the remainder of the separated air and the warmer cooling air from the separation module 102. The ejector 126 preferably creates a negative pressure or vacuum at the second outlet 114, thereby drawing cooling air into the second inlet 110, through the space surrounding the hollow fibers 130 (FIG. 6), and out of the second outlet 114. The ejector may be powered by the inlet pressurized air, or by internal or external ducting. Alternatively, the second outlet 114 may expel the remainder of the separated air and the warmer cooling air by any other suitable means.

FIG. 6 is a more detailed view of the separation module 102 shown and described in relation to FIG. 5. As can be seen more clearly in this figure, the compressed air or bleed air is introduced into the separation module 102 at the first inlet 108. In a preferred embodiment, the on-board filter 104 is positioned between the first inlet 108 and the ASM 106.

The ASM 106 preferably includes a bundle of hollow fiber membranes 130 fluidly coupling the first inlet and outlet to one another. These hollow fiber membranes 130 are preferably high temperature hollow fiber membranes that are capable of withstanding typical bleed air temperatures without requiring pre-cooling. In other words, these hollow fiber membranes 130 can withstand and operate in temperatures in excess of 300° F.

In use, compressed or bleed air flows into the first inlet 108, through the on-board filter 104 and into the hollow fiber membranes 130. As the compressed airflows through the hollow fiber membranes 130, oxygen and water vapor pass through the walls of the hollow fiber membranes 130 into space 132 surrounding each of the hollow fiber membranes 130. Compressed air substantially stripped of oxygen, now mainly nitrogen, exits the hollow fiber membranes 130 and is expelled as inert gas (or nitrogen enriched air (NEA)) from the separation module 102 via the first outlet 112.

Also in use, cooling air from the cooling air source (described above) enters the housing at the second inlet 110. The cooling air then passes through the space 132 surrounding each of the hollow fiber membranes 130 and is ultimately expelled from the second outlet 114. This space is defined by the separation module's housing 138, the outer perimeter of each of the hollow fibers and the end walls 134. The inlets and outlets of each of the hollow fiber membranes 130 are substantially hermetically sealed from the space 132 surrounding the hollow fiber membranes by the end walls 134.

The separation module 102 may also include another on-board filter 136 for filtering the incoming cooling air prior to the cooling airflow contacting the outside of the hollow fibers 130. Also the pressure within the fibers is generally kept higher than the pressure outside of the fibers so that separation only occurs in one direction, i.e., from within the fibers to the space surrounding the fibers. Furthermore, it should be noted that the position of the second inlet 110 and the second outlet 114 may be reversed. Alternatively, the second inlet 110 and the second outlet 114 may be positioned anywhere, as long as the second inlet 110 and the second outlet 114 penetrate the housing 138 of the separation module 102 between the end walls 134.

In use, the compressed air is ducted directly into the hollow fiber area within the module, i.e., through the hollow fibers 130, whereas the cooling airflows around the hollow fibers, i.e., flows through the space 132.

Figure 7:
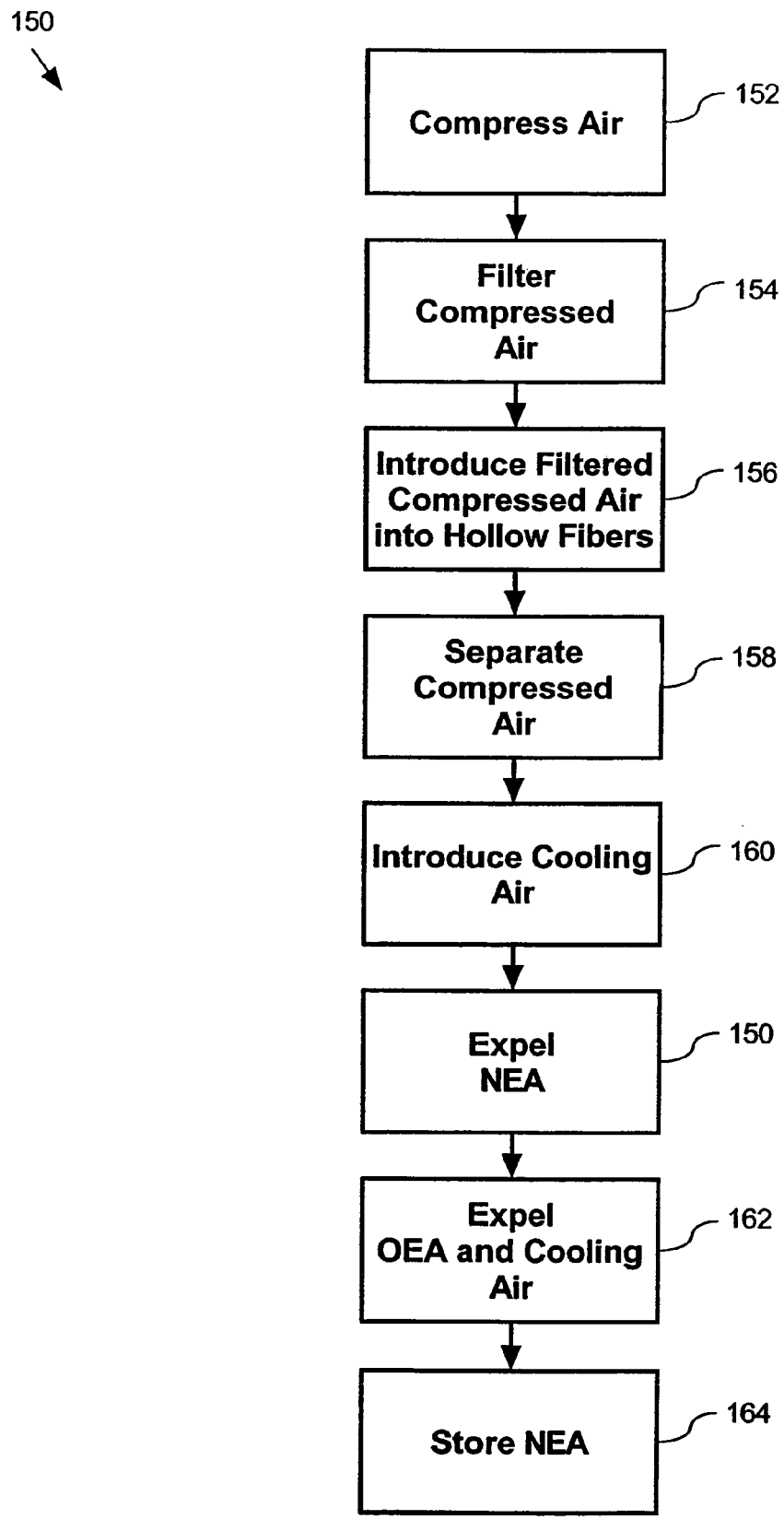
FIG. 7 is a flow chart of a method for obtaining an inert gas from a compressed air stream using the ASM shown in FIGS. 5 and 6.

FIG. 7 is a flow chart 150 of a method for obtaining an inert gas from a compressed air stream using the ASM 106 shown in FIGS. 5 and 6. Initially, air is compressed at step 152. This is preferably accomplished by the aircraft engine's compressor/s and extracted as bleed air. Subsequently, this compressed air is filtered at step 154, preferably by the on-board filter 104 (FIG. 6) and/or the separate filter 26 (FIG. 6). The filtered compressed air is then introduced into the hollow fibers 130 (FIG. 6), at step 156. The filtered compressed air is then separated, at step 158, by the hollow fibers 130 (FIG. 6) into oxygen enriched air (OEA) outside of the hollow fibers 130 (FIG. 6), i.e., in the space 132 (FIG. 6), and into nitrogen enriched air (NEA) at the first outlet 112 (FIG. 6) of the ASM 106 (FIG. 6).

While the filtered compressed air is being separated, at step 158, cooling air is introduced into the second inlet 110 at step 160. Control of the cooling air is regulated by the temperature sensor 122 (FIG. 5) and the valve 124 (FIG. 5), with or without a controller. This cooling air is preferably filtered by the other on-board filter 136 (FIG. 6). The cooling air passes through the space 132 (FIG. 6) surrounding the hollow fibers 130 (FIG. 6), thereby cooling the perimeter of the hollow fibers and mixing with the OEA. This cooling of the perimeter of the hollow fibers allows the hollow fibers themselves to cool the NEA passing through the hollow fibers.

The cooled NEA is then expelled from the first outlet 112 of the ASM 106 at step 150. At the same time, the OEA and now warmer cooling air is expelled from the second outlet 114 at step 162. The NEA is then preferably stored or introduced into the aircraft's fuel tanks or cargo areas.

The flow of cooling air around the hollow fibers may have the additional benefit of helping "strip" oxygen molecules from the hollow fiber surface, and also aspirate flow of the OEA to the outlet port. This in turn may help increase the efficiency of the fibers, by both applying a slight vacuum to the fiber surface, and ducting the OEA away from these surfaces.

Accordingly, the system 100 (FIG. 5) effectively utilizes the hollow fibers to both separate OEA from the compressed airflow source, and function as a heat exchanger. The input to the module is therefore compressed air and cooling air, while the output is cooled, filtered dry NEA, and OEA which is diluted in its $O_2$ concentration by mixing with the cooling airflow. In this way, cool inert gas is provided without the need for a separate heat exchanger, thereby reducing overall system complexity, size, and cost.

As the separation module 102 (FIGS. 5 and 6) performs a double duty, to both separate and cool the NEA flow, the fuel tank (or other space on the aircraft) can be inerted by cool NEA flow without the use of a heat exchanger or temperature control system. The additional potential benefit is to increase the efficiency of the separation module, due to aspiration of the OEA port, and the enhancement of the flow through the space surrounding the hollow fibers. System safety is also enhanced by ensuring that cooled NEA (instead of high temperature NEA) is introduced into the fuel tank or other space, and that OEA discharge flow is diluted with ambient air.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, the separation module may include more or less components, such as those included within the area marked by reference numeral 127. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

I claim:

1. An inert gas generating system comprising:
    a compressed air source;
    a cooling air source;
    a separation module, comprising:
        a housing;
        a first inlet in said housing, where said first inlet is fluidly coupled to said compressed air source;
        a first outlet in said housing for expelling inert gas enriched air, where said first outlet is fluidly coupled to said first inlet;
        a second inlet in said housing, where said second inlet is fluidly coupled to said cooling air source; and
        a second outlet in said housing, where said second outlet is fluidly coupled to said second inlet; and
    a control mechanism configured to regulate flow of cooling air from said cooling air source to said separation module.

2. The inert gas generating system of claim 1, wherein said control mechanism is coupled between said cooling air source and said separation module.

3. The inert gas generating system of claim 1, wherein the control mechanism comprises:
    a temperature sensor for measuring temperature; and
    a valve configured to regulate flow of cooling air from said cooling air source to said
    separation module based on the temperature.

4. The inert gas generating system of claim 3, wherein said temperature sensor is coupled between said cooling air source and said second inlet.

5. The inert gas generating system of claim 1, wherein said first inlet is coupled to said first outlet via multiple hollow fiber membranes.

6. The inert gas generating system of claim 5, wherein said separation module further comprises an on-board filter positioned between said first inlet and said multiple hollow fiber membranes.

7. The inert gas generating system of claim 5, wherein said hollow fiber membranes are high temperature hollow fiber membranes.

8. The inert gas generating system of claim 5, wherein said second inlet is fluidly coupled to said second outlet through a space surrounding said multiple hollow fiber membranes.

9. The inert gas generating system of claim 1, further comprising a filter positioned between said compressed air source and said first inlet.

10. The inert gas generating system of claim 1, wherein said cooling air source is a scoop.

11. The inert gas generating system of claim 1, wherein said compressed air source is bleed air.

12. The inert gas generating system of claim 1, further comprising an ejector coupled to said second outlet for expelling warmed cooling air from said separation module.

13. The inert gas generating system of claim 1, wherein said housing includes a tubular side wall and first and second end walls, wherein said first inlet and first outlet are disposed in a respective one of said first and second end walls and said second inlet and second outlet are disposed in said tubular side wall.

14. An inert gas generating system comprising:
a separation module comprising:
   a housing;
   a first inlet in said housing, wherein said first inlet is configured to be fluidly coupled to a compressed air source;
   a first outlet in said housing configured to expel inert gas enriched air;
   multiple hollow fiber membranes fluidly coupling said first inlet to said first outlet;
   a second inlet in said housing, wherein said second inlet is configured to be fluidly coupled to a cooling air source via a control mechanism that regulates flow of cooling air from the cooling air source to the second inlet; and
   a second outlet in said housing, where said second outlet is fluidly coupled to said second inlet through a space surrounding each of said hollow fiber membranes.

15. The inert gas generating system of claim 14, wherein said control mechanism comprises:
   a valve coupled between said cooling air source and said second inlet; and
   a temperature sensor configured to at least partially control said valve to regulate flow of cooling air from said cooling air source to said separation module.

16. The inert gas generating system of claim 14, wherein said hollow fiber membranes are a high temperature hollow fiber membranes.

17. The inert gas generating system of claim 14, wherein said housing includes a tubular side wall and first and second end walls, wherein said first inlet and first outlet are disposed in a respective one of said first and second end walls and said second inlet and second outlet are disposed in said tubular side wall.

18. A method for generating inert gas comprising:
compressing air into compressed air;
introducing said compressed air into multiple hollow fiber membranes;
separating said compressed air into Nitrogen Enriched Air (NEA) within said hollow
fiber membranes and Oxygen Enriched Air (OEA) in a space surrounding said hollow
fiber membranes;
measuring an air temperature;
regulating a flow of cooling air injected into said space based on said air temperature;
expelling said NEA from said hollow fiber membranes.

19. The method of claim 18, further comprising, prior to said introducing, filtering said compressed air.

20. The method of claim 18, wherein said compressed air is at an elevated temperature.

* * * * *